United States Patent
Shiota et al.

(10) Patent No.: US 7,920,559 B2
(45) Date of Patent: Apr. 5, 2011

(54) TRANSPONDER, TRANSMISSION SYSTEM, TRANSMISSION METHOD AND TRANSMISSION PROGRAM

(75) Inventors: Naoya Shiota, Tokyo (JP); Daisuke Uehara, Tokyo (JP); Tsutomu Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 459 days.

(21) Appl. No.: 12/046,954

(22) Filed: Mar. 12, 2008

(65) Prior Publication Data

US 2008/0225887 A1    Sep. 18, 2008

(30) Foreign Application Priority Data

Mar. 12, 2007  (JP) ................ 2007-061402

(51) Int. Cl.
  *H04L 25/49*  (2006.01)
(52) U.S. Cl. ......... 370/389; 370/473; 370/474; 370/315
(58) Field of Classification Search .......... 370/539, 370/389, 315, 373, 374; 398/43, 135
  See application file for complete search history.

(56) References Cited

U.S. PATENT DOCUMENTS

| | | | | |
|---|---|---|---|---|
| 6,650,638 | B1 * | 11/2003 | Walker et al. | 370/389 |
| 7,274,315 | B2 * | 9/2007 | Baumer | 341/95 |
| 7,782,805 | B1 * | 8/2010 | Belhadj et al. | 370/300 |
| 2006/0133812 | A1 * | 6/2006 | Lee et al. | 398/135 |
| 2007/0076768 | A1 * | 4/2007 | Chiesa et al. | 370/539 |
| 2008/0080860 | A1 * | 4/2008 | Katagiri | 398/43 |

FOREIGN PATENT DOCUMENTS

JP   2004015552 A   1/2004

* cited by examiner

*Primary Examiner* — William Trost, IV
*Assistant Examiner* — Emmanuel Maglo

(57) ABSTRACT

The transponder includes a 64B/66B code synchronization bit determination circuit 1511a for notifying a PLL selection control circuit of a control signal which instructs on selection of a variable oscillator or a variable oscillator in response to a case where an electric signal sent from an optical signal reception unit 111 includes a 64B/66B code synchronization bit, an A1A2 byte determination circuit 1511b for notifying the PLL selection control circuit of a control signal which instructs on selection of a variable oscillator or a variable oscillator in response to a case where an electric signal sent from the optical signal reception unit 111 includes an A1A2 byte, and the PLL selection control circuit 1512 for controlling a PLL selector 16 and a PLL selector 17 based on a control signal.

7 Claims, 4 Drawing Sheets

TRANSPONDER, TRANSMISSION SYSTEM, TRANSMISSION METHOD AND TRANSMISSION PROGRAM

This application is based upon and claims the benefit of priority from Japanese patent application No. 2007-0061402, filed on Mar. 12, 2007, the disclosure of which is incorporated herein in its entirety by reference.

TECHNICAL FIELD

The present invention relates to a transponder which relays a signal, a transmission system, a transmission method and a transmission program.

BACKGROUND ART

One example of a transponder which relays an optical signal is disclosed in Literature 1 (Japanese Patent Application No. 2002-167726). Shown in Literature 1 as an example of a transponder is a transponder in which optical energy of an infrared ray incident on a light receptive element 11 is converted into electric energy to drive each electric circuit, and a central processing unit 13 reads response information stored in a storage unit 14, based on which response information, a signal light as a response signal is emitted from a light emitting element 16.

Since in the transponder recited in Literature 1 or the like, a bit rate of a client signal to be received will be 9.95328 Gbps in a case of an STM-64/OS-192 and will be 10.3125 Gbps in a case of a 10 Gbit Ethernet (registered trademark) to differ in an operating rate, manual switching of a different set frequency of a 10 Gbit signal having a different rate is required.

OBJECT

An exemplary object of the present invention is to provide a transponder which needs no manual switching of different set frequencies even when a plurality of client signals received vary in a bit rate.

SUMMARY

According to a first exemplary aspect of the invention, a transponder for relaying a signal, which has a determination unit which discriminates kinds of a plurality of reception signals.

According to a second exemplary aspect of the invention, a transmission method of the signal in a transponder for relaying a signal, which has the step of discriminating kinds of a plurality of reception signals.

According to a third exemplary aspect of the invention, a computer readable medium storing a transmission program for transmitting the signal executed on a transponder for relaying a signal, which causes the transponder to execute processing of discriminating kinds of a plurality of reception signals.

With the above-described structure, kinds of a plurality of reception signals are automatically discriminated.

EXEMPLARY EMBODIMENT

First Exemplary Embodiment

A transponder according to the first exemplary embodiment of the present invention will be detailed with reference to the drawings.

Structure of the First Exemplary Embodiment

Figure 1:
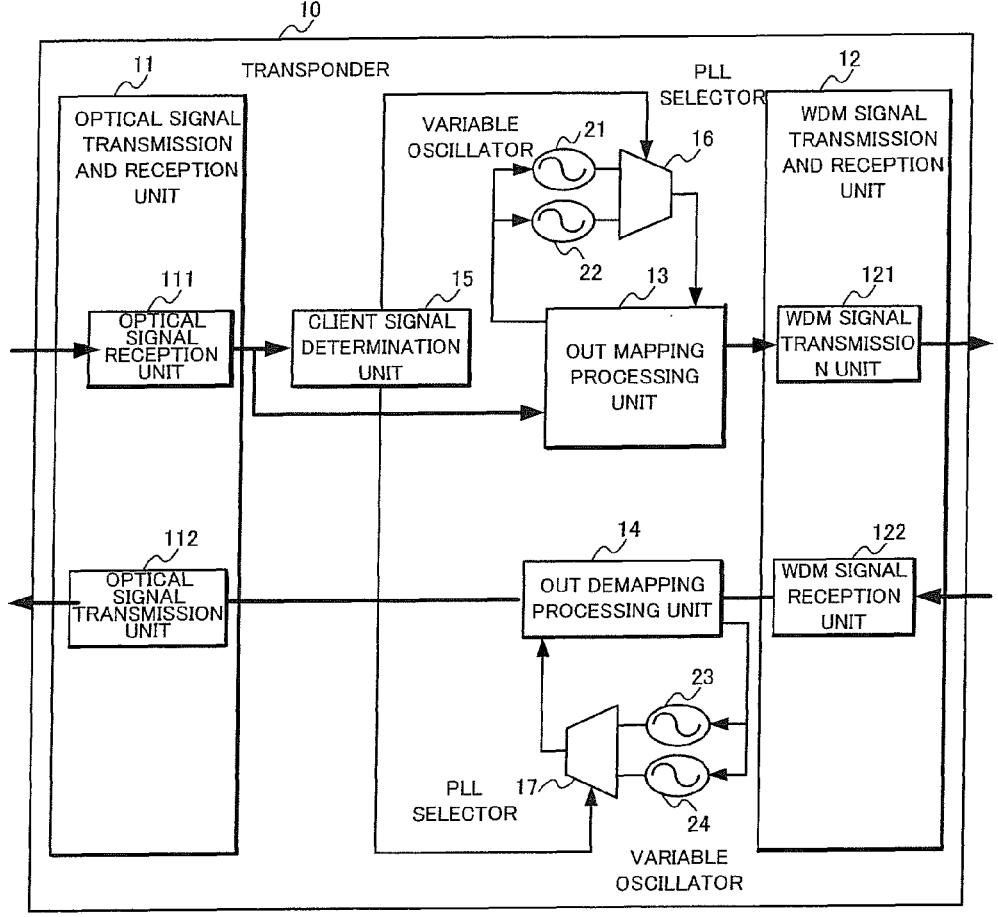
FIG. 1 is a block diagram showing a structure of a transponder according to a first exemplary embodiment of the present invention.

FIG. 1 is a block diagram showing a structure of the transponder according to the present exemplary embodiment.

With reference to FIG. 1, a transponder 10 of the present exemplary embodiment, which is for executing bidirectional conversion between an optical signal and an electric signal with an optical fiber connected in optical communication, comprises an optical signal transmission and reception unit 11, a WDM (Wavelength Division Multiplexing) signal transmission and reception unit 12, an OUT (Optical Channel Transport Unit) mapping processing unit 13, an OUT demapping processing unit 14, a client signal determination unit 15, a PLL (Phase-Locked Loop) selector 16, a PLL selector 17 and variable oscillators 21~24. Since other components than the client signal determination unit 15 are known, detailed description thereof will be omitted.

The optical signal transmission and reception unit 11 comprises an optical signal reception unit 111 having a function of converting an externally input optical signal (client signal) into an electric signal and an optical signal transmission unit 112 having a function of converting an electric signal demapped by the OUT demapping processing unit 14 into an optical signal and externally outputting the obtained signal.

The WDM signal transmission and reception unit 12 comprises a WDM signal transmission unit 121 for converting an electric signal mapped on an OTU frame by the OUT mapping processing unit 13 into an optical signal and externally outputting the obtained signal by wavelength division multiplexing, and a WDM signal reception unit 122 having a function of converting an externally input WDM signal into an electric signal.

The OUT mapping processing unit 13 has a function of mapping an electric signal sent from the optical signal reception unit 111 on an OTU frame.

The OUT demapping processing unit 14 has a function of demapping an electric signal sent from the WDM signal reception unit 122 into a client signal from an OTU frame.

The client signal determination unit 15 has a function of discriminating a kind of client signal received at the optical signal transmission and reception unit 11 based on an electric signal sent from the optical signal reception unit 111 and a function of sending a control signal which selects a PLL to be operated to the PLL selector 16 or the PLL selector 17 for controlling a PLL based on a discrimination result.

The PLL selector 16 and the PLL selector 17 have a function of selecting a PLL to be operated based on a control signal from the client signal determination circuit 15, with the PLL selector 16 being connected to the OUT mapping processing unit 13, and the variable oscillator 21 and the variable oscillator 22 and the PLL selector 17 being connected to the OUT demapping processing unit 14, and the variable oscillator 23 and the variable oscillator 24.

The variable oscillator 21 through the variable oscillator 24 are PLL oscillators, of which the variable oscillator 21 and the variable oscillator 23 are STM-64 variable oscillators, and the variable oscillator 22 and the variable oscillator 24 are 10 Gbit Ethernet (registered trademark) variable oscillators. The variable oscillator 21 and the variable oscillator 22 are connected to the PLL selector 16 and the OUT mapping processing unit 13, and the variable oscillator 23 and the variable oscillator 24 are connected to the PLL selector 17 and the OUT demapping processing unit 14.

Here, the client signal determination unit 15 as a characteristic structure of the present invention will be detailed.

Figure 2:
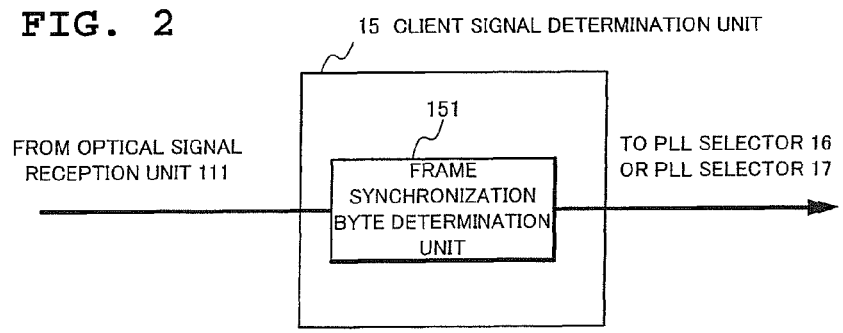
FIG. 2 is a block diagram showing a structure of a client signal determination unit according to the first exemplary embodiment.

FIG. 2 is a block diagram showing a structure of the client signal determination unit according to the present exemplary embodiment.

With reference to FIG. 2, the client signal determination unit 15 comprises a frame synchronization byte determination unit 151 having a function of determining a kind of frame of an electric signal sent from the optical signal reception unit 111.

Figure 3:
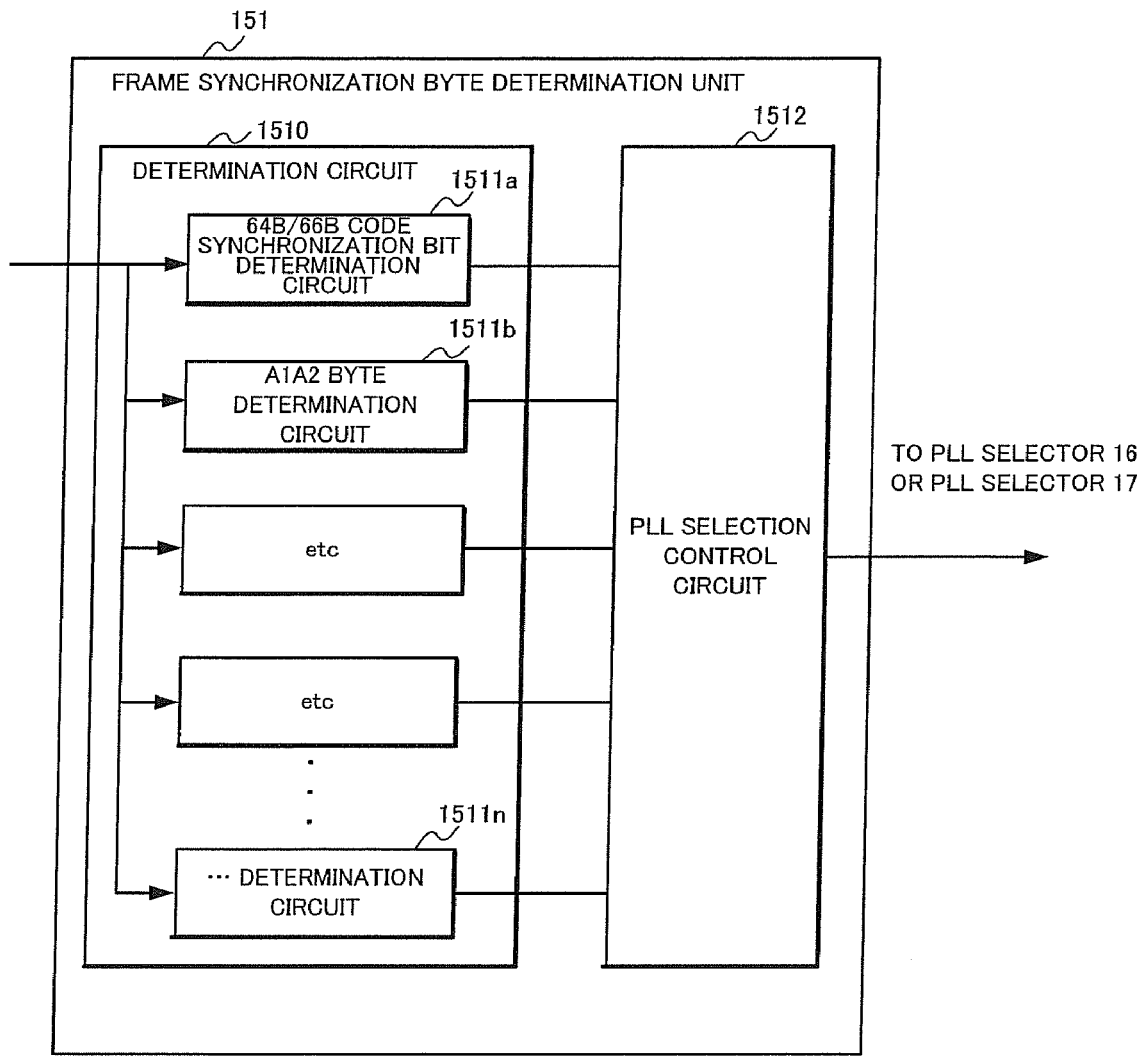
FIG. 3 is a block diagram showing a structure of a frame synchronization byte determination unit according to the first exemplary embodiment.

FIG. 3 is a block diagram showing a structure of the frame synchronization byte determination unit according to the present exemplary embodiment.

With reference to FIG. 3, the frame synchronization byte determination unit 151 comprises a determination circuit 1510 having a 64B/66B code synchronization bit determination circuit 1511a, an A1A2 byte determination circuit 1511b and the like to determine a kind of frame of an electric signal sent from the optical signal reception unit 111, and a PLL selection control circuit 1512.

The 64B/66B code synchronization bit determination circuit 1511a, which is responsive to a case where an electric signal sent from the optical signal reception unit 111 includes a 64B/66B code synchronization bit, has a function of notifying a control signal which instructs whether the variable oscillator 12 or the variable oscillator 14 should be selected to the PLL selection control circuit 1512.

The A1A2 byte determination circuit 1511b, which is responsive to a case where an electric signal sent from the optical signal reception unit 111 includes an A1A2 byte, has a function of notifying the PLL selection control circuit 1512 of a control signal which instructs whether the variable oscillator 11 or the variable oscillator 13 should be selected.

The PLL selection control circuit 1512 has a function of controlling the PLL selector 16 and the PLL selector 17 based on a control signal notified by the determination circuit 1510 such as the 64B/66B code synchronization bit determination circuit 1511a or the A1A2 byte determination circuit 1511b.

In a case where the determination circuit 1510 has a determination circuit 1511n responsive to other signals than a 64B/66B code or an A1A2 byte, the determination circuit 1511n has the same function as those of the 64B/66B code synchronization bit determination circuit 1511a and the A1A2 byte determination circuit 1511b and is allowed to determine kinds of more numbers of a plurality of signals.

Figure 4:
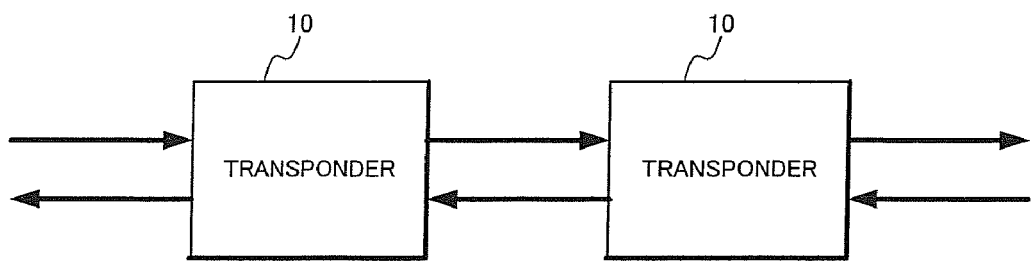
FIG. 4 is a block diagram showing a structure of a transmission system comprising a plurality of the transponders according to the first exemplary embodiment.

FIG. 4 is a block diagram showing a structure of a transmission system comprising a plurality of the transponders according to the present exemplary embodiment. Since the structure of the present transmission system can be described by the above-described structure of the transponder according to the present exemplary embodiment, description thereof will be omitted.

Here, a hardware structure of the client signal determination unit 15 will be described.

Figure 5:
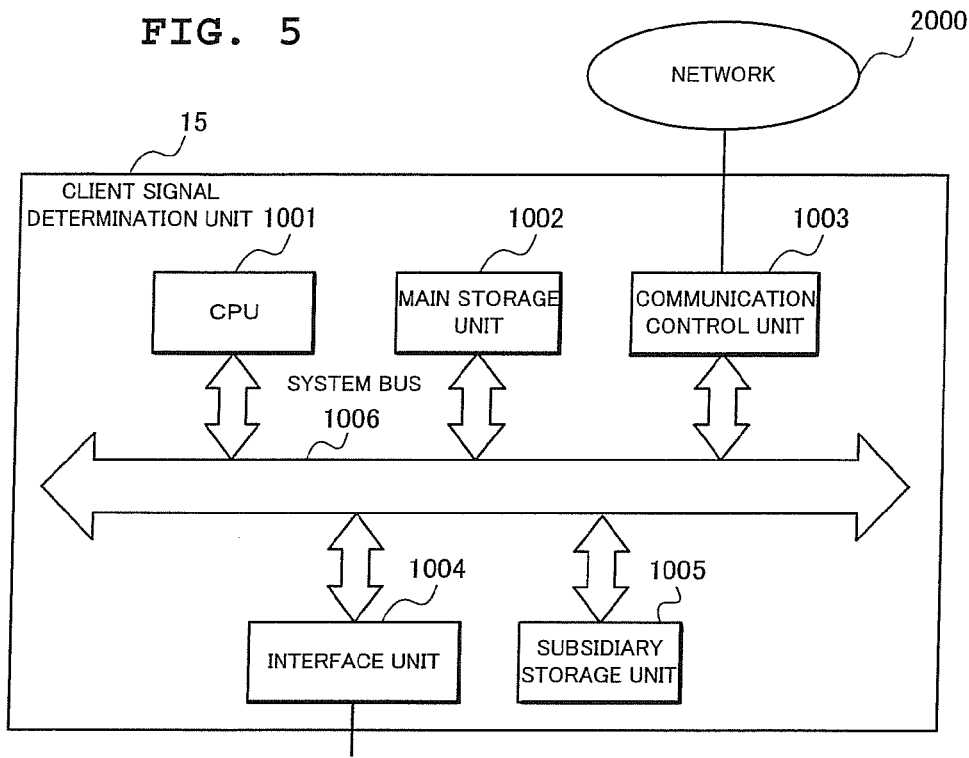
FIG. 5 is a block diagram showing a hardware structure of the client signal determination unit according to the first exemplary embodiment.

FIG. 5 is a block diagram showing an example of a hardware structure of the client signal determination unit 15 according to the present exemplary embodiment.

With reference to FIG. 5, the client signal determination unit 15 according to the present invention, which can be realized by the same hardware structure as that of a common computer device, comprises a CPU (Central Processing Unit) 1001, a main storage unit 1002 which is a main memory such as a RAM (Random Access memory) for use as a data working region or a data temporary saving region, a communication control unit 1003 for transmitting and receiving data through a network 2000, an interface unit 1004 connected to a peripheral apparatus for transmitting and receiving data, a subsidiary storage unit 1005 as a hard disk device formed of a non-volatile memory such as a ROM (Read Only memory), a magnetic disk or a semiconductor memory, and a system bus 1006 for connecting the above-described respective components of the present information processing device.

The client signal determination unit 15 according to the present invention has its operation realized not only in hardware with a circuit part mounted which is formed of a hardware part such as an LSI (Large Scale Integration) having a program for realizing these functions incorporated in the client signal determination unit 15 but also in software by executing a program providing each function of the above-described respective components by the CPU 1001 on a computer processing device.

In other words, the CPU 1001 realizes each of the above-described functions in software by loading a program stored in the subsidiary storage unit 1005 into the main storage unit 1002 and executing the same, thereby controlling operation of the client signal determination unit 15.

Operation of the First Exemplary Embodiment

Figure 6:
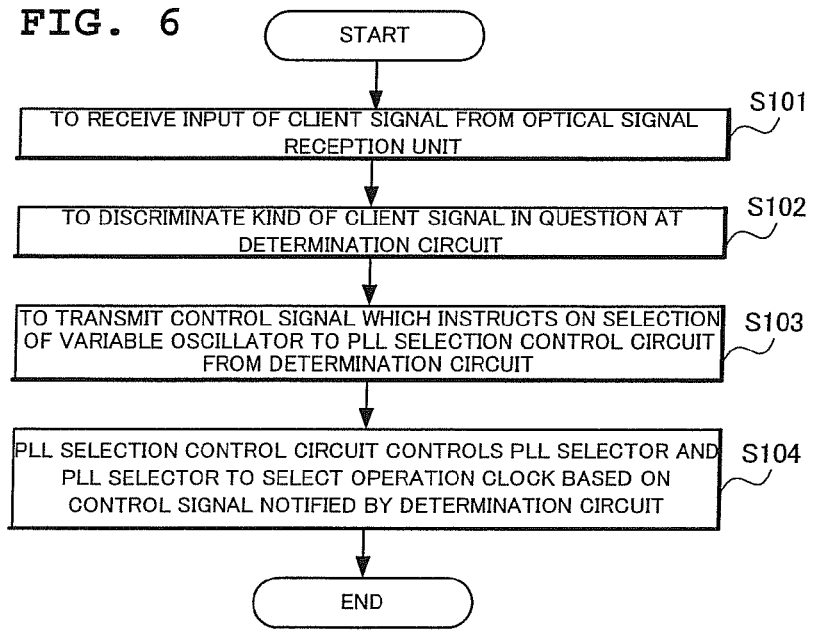
FIG. 6 is a flow chart showing operation of the client signal determination unit according to the first exemplary embodiment.

FIG. 6 is a flow chart showing operation of the client signal determination unit according to the present exemplary embodiment.

With reference to FIG. 6, when receiving input of a client signal from the optical signal reception unit 111 (Step S101), the client signal determination unit 15 discriminates a kind of the client signal in question at the determination circuit 1510 (Step S102).

More specifically, when detecting an A1A2 byte of SONET/SDH in the client signal in question, the determination circuit 1510 determines that it is an STM-64/OC-192 and when detecting a 64B/66B code synchronization bit in the electric signal in question, determines that it is a 10 Gbit Ethernet (registered trademark).

Next, the client signal determination unit 15 sends a control signal for instructing on selection of a variable oscillator from the determination circuit 1510 to the PLL selection control circuit 1512 in order to select an operation clock based on the determination result (Step S103).

Next, the PLL selection control circuit 1512 controls the PLL selector 16 and the PLL selector 17 to select an operation clock based on the control signal notified by the determination circuit 1510 (Step S104).

Effects of the First Exemplary Embodiment

The present exemplary embodiment attains the effect of enabling automatic switching between STM-64/OC192 and 10 Gbit Ethernet (registered trademark) according to an input signal, which operation should be executed manually.

The reason is that the determination circuit 1510 automatically selects an operation clock by detecting an A1A2 byte peculiar to an STM-64/OC-192 signal from a frame of a client signal at the 64B/66B code synchronization bit determination circuit 1511a and detecting a 64B/66B code synchronization bit peculiar to a 10 Gbit Ethernet (registered trademark) signal at the A1A2 byte determination circuit 1511b to transmit a control signal for instructing which variable oscillator should be selected.

Second Exemplary Embodiment

A transponder according to a second exemplary embodiment of the present invention will be detailed with reference to the drawings.

Structure of the Second Exemplary Embodiment

Figure 7:
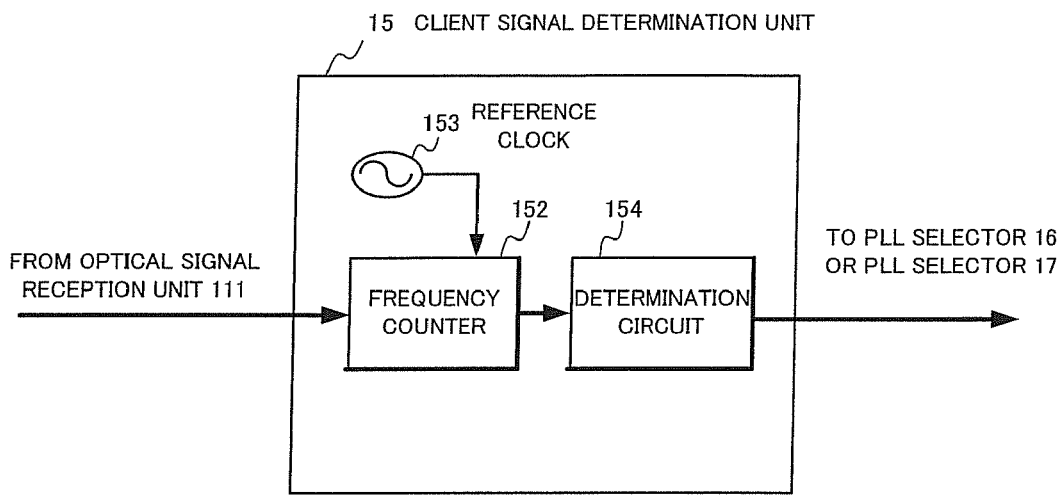
FIG. 7 is a block diagram showing a structure of a client signal determination unit in a transponder according to a second exemplary embodiment of the present invention.

FIG. 7 is a block diagram showing a structure of a client signal determination unit in the transponder according to the present exemplary embodiment.

With reference to FIG. 7, the client signal determination unit 15 according to the present exemplary embodiment, which has a function of determining a kind of client signal sent from the optical signal reception unit 111 based on a clock frequency, differs from the client signal determination unit 15 according to the first exemplary embodiment in comprising a frequency counter 152, a reference clock 153, a determination circuit 154 and a PLL selection control circuit 155 in place of the frame synchronization byte determination unit 151.

The frequency counter 152 has a function of receiving input of a clock signal sent from the optical signal reception unit 111 and counting an input frequency of the input clock signal with the reference clock 153 as a reference clock to notify the determination circuit 154 of a count result.

The determination circuit 154 has a function of determining a kind of clock signal sent from the optical signal reception unit 111 based on a count result notified by the frequency counter 152 and sending a control signal for instructing which variable oscillator should be selected to the PLL selection control circuit 155 based on the determination result.

The PLL selection control circuit 155 has the same function as that of the PLL selection control circuit 1512 according to the first exemplary embodiment, the function of controlling the PLL selector 16 and the PLL selector 17 based on a control signal notified by the determination circuit 154.

Operation of the Second Exemplary Embodiment

Figure 8:
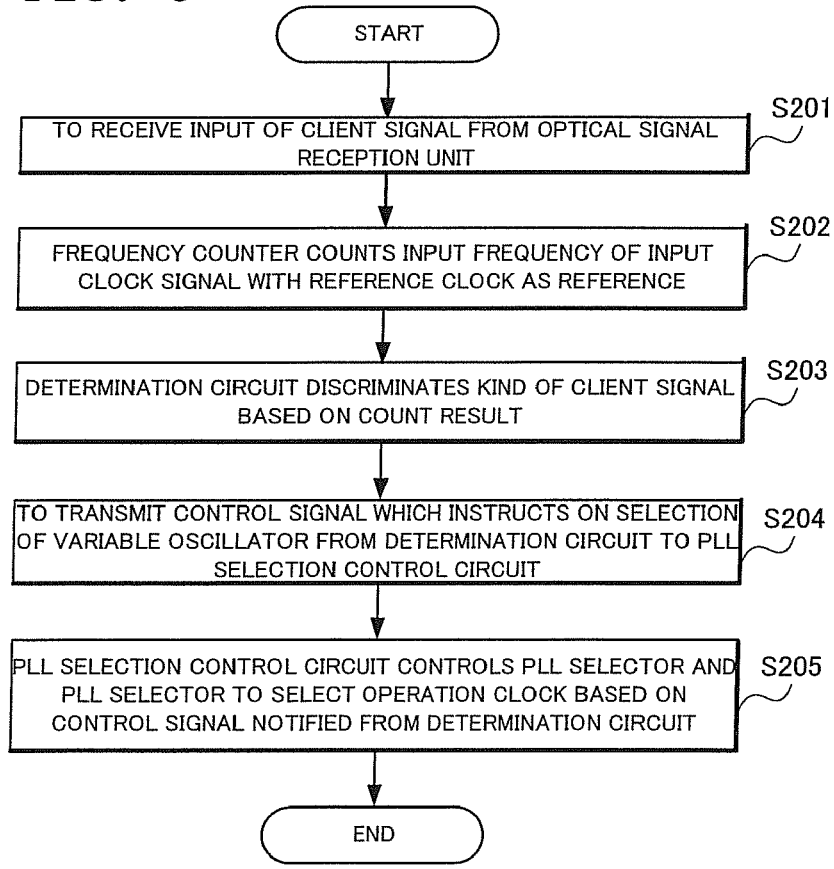
FIG. 8 is a flow chart showing operation of the client signal determination unit according to the second exemplary embodiment.

FIG. 8 is a flow chart showing operation of the client signal determination unit according to the present exemplary embodiment.

With reference to FIG. 8, in the client signal determination unit 15, when a client signal is applied from the optical signal reception unit 111 (Step S201), the frequency counter 152 counts an input frequency of the input clock signal with the reference clock 153 as a reference (Step S202) and the determination circuit 154 discriminates a kind of the client signal in question based on the count result (Step S203).

Next, the client signal determination unit 15 sends a control signal which instructs on selection of a variable oscillator to the PLL selection control circuit 155 from the determination circuit 154 in order to select an operation clock based on the determination result (Step S204).

Next, the PLL selection control circuit 155 controls the PLL selector 16 and the PLL selector 17 based on the control signal notified by the determination circuit 154 to select an operation clock (Step S205).

Effects of the Second Exemplary Embodiment

The present exemplary embodiment, similarly to the first exemplary embodiment, attains the effect of automatic switching between an STM-64/OC192 and a 10 Gbit Ethernet (registered trademark) by an input signal, which should be executed manually.

The reason is that the frequency counter 152 counts an input frequency of an input clock signal with the reference clock 153 as a reference and the determination circuit 154 discriminates a kind of the client signal in question based on the count result to transmit a control signal for instructing which variable oscillator should be selected, thereby automatically selecting an operation clock.

The exemplary embodiments attain the effect of automatically setting a frequency according to a received reception signal, which processing should be executed manually when a plurality of reception signals received have different bit rates.

The reason is that because of the function of discriminating kinds of a plurality of reception signals, kinds of the plurality of reception signals can be automatically discriminated.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2007-061402, filed on Mar. 12, 2007, the disclosure of which is incorporated herein in its entirety by reference.

INDUSTRIAL APPLICABILITY

The present invention is applicable to a 10 Gb/s transponder for use in a WDM transmission system.

The invention claimed is:

1. A transponder for relaying a signal, comprising:
a determination unit which discriminates kinds of a plurality of reception signals and outputs a control signal for selecting a clock signal according to a transmission mode of a reception signal based on a discrimination result of said reception signal; and,
a selection unit which switches a transmission mode by selecting automatically a clock signal according to said reception signal discriminated by said determination unit from among a plurality of clock signals set for each said reception signal which is used in transmission of said reception signal based on said control signal from said determination unit, wherein a plurality of said reception signals are STM-64/OC-192 signals or 10 Gbit Ethernet signals, and said determination unit discriminates whether said reception signal is said STM-64/OC-192 signal or said 10 Gbit Ethernet signal by detecting an A1A2 byte or a 64B/66B code synchronization bit.

2. The transponder according to claim 1, wherein said determination unit discriminates a kind of said reception signal based on a count result obtained by counting an input frequency of the reception signal based on a reference clock.

3. A transmission system, comprising the transponder according to claim 1.

4. A transmission method of said signal in a transponder for relaying a signal, comprising:
   a step of discriminating kinds of a plurality of reception signals and outputting a control signal for selecting a clock signal according to a transmission mode of a reception signal based on a discrimination result of said reception signal; and,
   a step of switching a transmission mode by selecting automatically a clock signal according to said reception signal discriminated by said determination step from among a plurality of clock signals set for each said reception signal which is used in transmission of said reception signal based on said control signal, wherein at the step of discriminating kinds of the plurality of said reception signals, discrimination whether said reception signal is said STM-64/OC-192 signal or said 10 Gbit Ethernet signal is executed by detecting an A1A2 byte or a 64B/66B code synchronization bit.

5. The transmission method according to claim 4, wherein at the step of discriminating kinds of the plurality of said reception signals, a kind of said reception signal is discriminated based on a count result obtained by counting an input frequency of the reception signal based on a reference clock.

6. A non-transitory computer readable medium storing a transmission program for transmitting said signal executed on a transponder for relaying a signal, which causes said transponder to execute:
   a processing of discriminating kinds of a plurality of reception signals and outputting a control signal for selecting a clock signal according to a transmission mode of a reception signal based on a discrimination result of said reception signal; and,
   a processing of switching a transmission mode by selecting automatically a clock signal according to said reception signal discriminated by said determination step from among a plurality of clock signals set for each said reception signal which is used in transmission of said reception signal based on said control signal, wherein said transmission program causes execution of processing of discriminating whether said reception signal is said STM-64/OC-192 signal or said 10 Gbit Ethernet signal by detecting an A1A2 byte or a 64B/66B code synchronization bit.

7. The non-transitory computer readable medium according to claim 6, wherein said transmission program causes execution of processing of discriminating a kind of said reception signal based on a count result obtained by counting an input frequency of the reception signal based on a reference clock.

* * * * *